United States Patent [19]

Coran et al.

[11] 4,327,199

[45] Apr. 27, 1982

[54] THERMOPLASTIC CRYSTALLINE POLYESTER MODIFIED ACRYLIC COPOLYMER RUBBER

[75] Inventors: Aubert Y. Coran; Raman Patel, both of Akron, Ohio

[73] Assignee: Monsanto Company, St. Louis, Mo.

[21] Appl. No.: 226,317

[22] Filed: Jan. 19, 1981

[51] Int. Cl.$^3$ .............................................. C08L 67/02
[52] U.S. Cl. ..................................... 525/176; 525/919
[58] Field of Search ....................... 525/176, 170, 919

[56] References Cited

U.S. PATENT DOCUMENTS

| | | | |
|---|---|---|---|
| 3,264,272 | 8/1966 | Rees | 525/221 |
| 3,437,718 | 4/1969 | Rees | 260/889 |
| 4,010,222 | 3/1977 | Shih | 525/176 |
| 4,141,863 | 2/1979 | Caron et al. | 525/175 |

*Primary Examiner*—J. Ziegler
*Attorney, Agent, or Firm*—Larry R. Swaney

[57] ABSTRACT

Thermoplastic compositions are described comprising neutralized acrylic copolymer rubber reinforced by thermoplastic crystalline polyester which compositions exhibit improved high temperature properties.

15 Claims, No Drawings

THERMOPLASTIC CRYSTALLINE POLYESTER MODIFIED ACRYLIC COPOLYMER RUBBER

This application relates to neutralized acid containing acrylic copolymer rubber compositions, and more particularly, to said compositions containing thermoplastic crystalline polyester intimately blended therewith.

BACKGROUND OF THE INVENTION

Metal ion neutralized acid containing acrylic copolymer rubbers are thermoplastic elastomeric materials useful for molded parts, but their usefulness is restricted due to their tendency to flow at elevated temperatures. Accordingly, if this deficiency can be overcome, they may be used in applications where high temperatures are encountered.

SUMMARY OF THE INVENTION

It has now been discovered that improved thermoplastic compositions comprising neutralized acid containing acrylic copolymer rubber are obtained by blending thermoplastic crystalline polyester therewith. The improved compositions are stronger and exhibit better oil resistance than compositions containing no thermoplastic crystalline polyester. Surprisingly, the new compositions exhibit useful properties at temperatures above the melting temperature of the thermoplastic crystalline polyester. Generally, the compositions of the invention exhibit an increase in flow temperature of at least 10° C. above the flow temperature of the thermoplastic crystalline polyester. The reason that the compositions have better properties, especially better high temperature properties is not understood, but it is believed to be because of some type of interaction between the acrylic copolymer rubber and the thermoplastic crystalline polyester.

Improved high temperature properties are obtained with compositions comprising about 25 to 98 parts by weight of neutralized acid containing acrylic copolymer rubber and about 75 to about 2 parts by weight of thermoplastic crystalline polyester per 100 parts by weight of said rubber and thermoplastic crystalline polyester combined. When the amount of thermoplastic crystalline polyester is not more than 50 weight percent of the composition, thermoplastic elastomeric (elastoplastic) compositions are obtained.

Thus, an elastoplastic composition of the invention comprises a blend of thermoplastic crystalline polyester, in an amount up to 50 weight percent of the composition, and neutralized acid containing acrylic copolymer rubber, in an amount sufficient to impart rubberlike elasticity up to 98 weight percent of the composition, which composition is processable as a thermoplastic and is elastomeric. The composition can contain plasticizer for thermoplastic crystalline polyester or rubber. For the elastomeric compositions of the invention, however, if the composition contains more thermoplastic crystalline polyester than rubber, sufficient plasticizer must be present to impart rubberlike elasticity to the composition. Compositions frequently contain plasticizer in an amount not exceeding the weight of the thermoplastic crystalline polyester. However, thermoplastic elastomeric compositions of the invention can be obtained without any plasticizer whatsoever so long as the amount of thermoplastic crystalline polyester does not exceed 50 weight percent of the composition. In other words, in compositions containing 50 weight percent or less of thermoplastic crystalline polyester, plasticizers optionally may be present but they are not required to obtain elastoplasticity unless the amount of thermoplastic crystalline polyester exceeds the amounts of rubber.

Preferred elastoplastic compositions of the invention comprise about 98 to 50 parts by weight of neutralized acid containing acrylic copolymer rubber and about 2 to 50 parts by weight of thermoplastic crystalline polyester per 100 parts by weight of said rubber and thermoplastic crystalline polyester combined. More preferred compositions exhibiting high strength, high elongation, high flow temperature and low Young's modulus comprise metal ion neutralized acid containing acrylic copolymer rubber and about 10 to 40 parts by weight of thermoplastic crystalline polyester per 100 parts by weight of said rubber and thermoplastic crystalline polyester combined. The compositions may be prepared by melt mixing, preferably by mastication, above the melting temperature of the thermoplastic crystalline polyester, neutralized acid containing acrylic copolymer rubber and thermoplastic crystalline polyester in the indicated proportions. A more preferred procedure comprises melt mixing the acid containing acrylic copolymer rubber and thermoplastic crystalline polyester until a homogeneous composition is obtained, then an acid polymer neutralizing agent, for example, a source of metal ion such as magnesium oxide or zinc oxide is added and mixing is continued until neutralization of the acid occurs. Interaction between the thermoplastic crystalline polyester and neutralized copolymer rubber can occur during melt mixing. Preferably, enough neutralizing agent is used to neutralize at least 50 percent of the acid. More preferably, the amount of neutralizing agent is sufficient to essentially completely neutralize all of the acid groups present in the rubber molecule. For examples of satisfactory metal ions, see Rees U.S. Pat. No. 3,264,272, issued Aug. 2, 1966, especially Columns 5 and 6, the disclosure of which is incorporated herein by reference.

Suitable acid containing acrylic copolymer rubbers comprise rubbery ethylenically unsaturated carboxylic acid-acrylic ester copolymers. The rubber of the invention must contain about 0.1–25 mole percent of acrylic acid or methacrylic acid. They are distinguished from polyacrylate rubbers which generally are essentially acrylic ester polymers. Suitable rubbers include acrylic acid-acrylic ester-alpha-olefin terpolymers which are essentially non-crystalline and have glass transition temperatures (Tg) below room temperature. The rubber may be prepared by partial hydrolysis of a polyacrylate rubber to obtain the required acid groups. Polyacrylate rubbers suitable for this purpose are described in Rubber World Blue Book, 1975 Edition, pages 399–400. Suitable copolymer rubbers are preferably prepared by polymerization of alkyl acrylate, acrylic acid or methacrylic acid and an alpha olefin of 2–8 carbon atoms. A preferred rubber is a polymer of ethylene, $C_1$–$C_4$ alkyl acrylate and acrylic acid. A more preferred acrylic acid rubber is a polymer comprising at least 50 mole percent of ethylene, about 0.5 to 10 mole percent acrylic acid and about 10 to 49.5 mole percent of alkyl acrylate.

Suitable thermoplastic polyesters comprise crystalline, high molecular weight solid polymers having recurring

groups within the polymer chain. The recurring ester groups are within the polymer backbone and not pendant therefrom. Crystalline polyesters having melting points of 50° C. or above the satisfactory; polyesters having melting points above 100° C. are preferred and polyesters having melting points between 160°–260° C. are more preferred. Saturated polyesters (free of olefinic unsaturation) are preferred, however, unsaturated polyesters may be used provided that no crosslinking agent is present which will significantly induce crosslink formation in the polyester. Crosslinked polyesters are unsatisfactory for the practice of the invention. The term crystalline as used herein means that the polyester is at least partially crystallizable. For example, polycarbonate plastics are crystallizable but they may exist as noncrystalline glassy materials under many conditions of use. Commercially available thermoplastic crystalline polyesters may be advantageously employed in the practice of the invention or they may be prepared by polymerization of lactones, or one or more dicarboxylic acids, anhydrides or esters and one or more diols. Examples of satisfactory polyesters are described in the Coran et al. U.S. Pat. No. 4,141,863, particularly, Columns 7–8, the disclosure of which is incorporated herein by reference.

In the compositions of the invention, a sufficient amount of the acid groups of the rubber molecule are in the form of carboxylate salt groups which comprise at least 0.1 mole percent or preferably 0.25 mole percent of the rubber monomer composition. A preferred neutralized acrylic copolymer rubber of the invention comprises about 1 to 5 weight percent of acrylic acid and about 0.5 to 4 parts by weight of metal oxide per 100 parts by weight of rubber.

One aspect of the invention comprises adding a plasticizer to the blend which plasticizer extends the range of proportions of thermoplastic crystalline polyester in the composition while still retaining elastoplasticity. For example, without plasticizer the weight of thermoplastic crystalline polyester cannot exceed the weight of rubber without losing rubberlike elasticity, whereas, the plasticizer, the weight of thermoplastic crystalline polyester may exceed the weight of rubber so long as the amount of thermoplastic crystalline polyester does not comprise more than 50 weight percent of the total composition. Generally, the quantity of plasticizer, when present, is 1–30 weight percent but it may comprise up to 65 weight percent of the total composition. Any polyester or acrylic copolymer rubber plasticizer may be used. Preferred plasticizers have low volatility, i.e., having a boiling point of at least 300° C. More preferred plasticizers have vapor pressures of less than 200 mm Hg, more preferably, less than 100 mm Hg, at 300° C. Suitable plasticizers are selected from the group consisting of phthalate plasticizers, adipate plasticizers, phosphate plasticizers, glycolate plasticizers, sulfonamide plasticizers, trimellitate plasticizers, epoxidized vegetable oil plasticizers and polymeric type permanent plasticizers. A preferred subclass of plasticizers are selected from the group consisting of epoxidized vegetable oil plasticizers and sulfonamide plasticizers.

Examples of suitable plasticizers are epoxidized soy bean oil or sunflower oil, dibutyl phthalate, dicyclohexyl phthalate, diethyl phthalate, diisodecyl phthalate, dimethyl phthalate, di(2-ethylhexyl)phthalate, diphenyl phthalate, diundecyl phthalate, mixed $C_7$–$C_{11}$ dialkyl phthalate, butyl benzyl phthalate, benzyl phthalate, di(2-ethylhexyl)adipate, mixed $C_7$–$C_9$ dialkyl adipate, tributoxyethyl phosphate, tributyl phosphate, tricresyl phosphate, triphenyl phosphate, cresyl diphenyl phosphate, 2-ethylhexyl diphenyl phosphate, isodecyl diphenyl phosphate, butyl phthalyl butyl glycolate, methyl phthalyl ethyl glycolate and mixed $C_7$–$C_9$ alkyl trimellitate. Sulfonamide plasticizers comprise a preferred class of plasticizers for thermoplastic crystalline polyester, for example, N-butyl benzylsulfonamide, N-cyclohexyl-p-toluenesulfonamide, o,p-toluenesulfonamide, N-ethyl-o,p-toluenesulfonamide and N-ethyl-o-toluenesulfonamide. For examples of other suitable plasticizers, refer to *Encyclopedia of Chemical Technology*, Vol. 10, Plasticizers, pages 780–797.

The properties of the compositions of the invention may also be modified by the addition of other ingredients which are conventional in the compounding of acrylic rubber or thermoplastic crystalline polyester. Examples of such ingredients include carbon black, silica, titanium dioxide, other pigments, clay, silanes, titanates or other coupling agents, stabilizers, antidegradants, processing aids, adhesives, tackifiers, wax, and discontinuous fibers such as wood cellulose or glass fibers, etc. The incorporation of particulate filler into the rubber, preferably prior to melt mixing or neutralization of the acid groups is particularly recommended. The particulate filler is generally masterbatched with the rubber which is then mixed with the thermoplastic crystalline polyester. Typical additions of particulate fillers or reinforcement fillers such as silica or carbon black comprise about 15–80 parts by weight of filler per 100 parts by weight of rubber. The amount of particulate filler which can be used depends, at least in part, upon the type of filler and the presence of other ingredients such as plasticizer.

Thermoplastic compositions of the invention are useful for making a variety of articles such as hoses, belts, gaskets, moldings and molded parts. They are particularly useful for making articles by extrusion, injection molding and compression molding techniques. Compositions of the invention are also especially useful for parts which are exposed to organic liquids and high temperatures.

Tensile properties of the compositions are determined by ASTM procedures D-1708-66 and D-638. Specimens are pulled with a tensile tester at 2.5 cm. per minute up to 30 percent elongation and 25.4 cm. per minute to failure (unless specified otherwise). The term "elastomeric" as used herein and in the claims refers to rubber-like elasticity of a composition which possesses the property of forcibly retracting within ten minutes to less than 150% of its original length after being stretched at room temperature to twice its unstressed length and held for ten minutes before release (e.g. tension set is 50% or less). True stress at break (TSB) is the tensile strength at break multiplied by the extension ratio also at break, extension ratio being the length of a tensile test specimen at break divided by the original, unstressed length of the test specimen. Alternatively, extension ratio is 1.00 plus 1/100 of the percent ultimate elongation. Especially preferred compositions of the invention are rubbery compositions having tension set values of about 40% or less. A more preferred composition additionally has a Shore D hardness of 50 or below or a Young's modulus E below about 100 MPa.

DESCRIPTION OF THE PREFERRED EMBODIMENTS

Compositions illustrating the invention are prepared by charging thermoplastic crystalline polyester, acid containing acrylic copolymer rubber, and magnesium oxide in the indicated amounts (all parts by weight), into a Brabender mixer with cam rotors and an oil bath temperature of 220° C. The mixing speed is varied to maintain the stock temperature between 225°–235° C. A nitrogen purge is fed through the ram to minimize oxidative degradation. After the thermoplastic crystalline polyester is melted, the components are mixed for several minutes during which the mixing torque increases. The compositions are removed from the mixer and then returned and mixed for two additional minutes. Test specimens are prepared by compression molding at about 250° C. Properties of the molded sheet are then measured and recorded.

Materials used to illustrate the invention are as follows: acid containing acrylic copolymer rubber purchased under the tradename of Vamac believed to be a terpolymer of about 73 mole percent of ethylene, about 26 mole percent methyl methacrylate and about one mole percent of acrylic acid, poly(tetramethyleneterphthalate) (PTMT), m.p. 225°–226° C., purchased under the tradename Tenite 6P20A and magnesium oxide purchased under the tradename Maglite D.

The effect of thermoplastic crystalline polyester/rubber proportions is shown in Table 1. The magnesium oxide level is held constant at 2 parts by weight per 100 parts by weight of rubber. The rubber is Vamac N-123 supplied in the form of a masterbatch of 100 parts of rubber and 23 parts of fumed silica, stabilizers and processing aids. For convenience, the amount of rubber and silica (plus stabilizers and processing aids) are shown separately in the tables. The data show that incorporating thermoplastic crystalline polyester into the neutralized rubber results in improved properties including higher tensile strength, better (lower) oil swell and better (higher) flow temperatures.

Flow temperature of compositions of the invention are determined by measuring dimensional changes of specimens subject to pressure at various temperatures. Each test specimen, in the form of a disk about 0.5 cm. diameter and about 2 mm thick, is pressed between two rigid heated plates separated by 30 mil. spacers. Samples are heated under pressure at temperatures between 125° C. and 300° C. at 25° C. intervals after 5 minutes between the hot plates at 125° C., the specimens are removed, allowed to cool to room temperature, and the thickness is measured. Set, C, (in %) is calculated for each specimen by the equation $C = [(t_o - t_i) \div (t_o - t_s)] \times 100$ where $t_o$ is the original specimen thickness, $t_i$ is the specimen thickness after a treatment, and $t_s$ is the thickness of the spacers. For each specimen, the process is repeated at 150° C., then at 175° C. etc. Testing with a particular specimen is discontinued after the set value C reaches 100%. Flow temperature is the temperature at which the set value is 100%. It is estimated from a plot of C against the temperature of pressing. The data show that the addition of PTMT increases the flow temperature of the composition and that the flow temperature increases as the amount of PTMT increases until the amount of thermoplastic crystalline polyester exceeds 70 parts by weight. Surprisingly, the flow temperature in compositions containing 5 to 70 parts by weight of PTMT is substantially higher than either the flow temperature of the neutralized rubber alone or the melting point of PTMT.

TABLE 1

|  | 1 | 2 | 3 | 4 | 5 | 6 | 7 | 8 | 9 | 10 | 11 |
|---|---|---|---|---|---|---|---|---|---|---|---|
| Acidic Acrylic Rubber | 100 | 95 | 90 | 80 | 70 | 60 | 50 | 40 | 30 | 20 | 10 |
| Polyester (PTMT) | 0 | 5 | 10 | 20 | 30 | 40 | 50 | 60 | 70 | 80 | 90 |
| Silica, Stabilizers & Processing Aids | 23 | 21.9 | 20.7 | 18.4 | 16.1 | 13.8 | 11.5 | 9.2 | 6.9 | 4.6 | 2.3 |
| MgO | 2.0 | 1.9 | 1.8 | 1.6 | 1.4 | 1.2 | 1.0 | 0.8 | 0.6 | 0.4 | 0.2 |
| Properties |  |  |  |  |  |  |  |  |  |  |  |
| TS, Mpa | 21.0 | 20.9 | 20.9 | 23.1 | 22.7 | 25.7 | 23.9 | 24.4 | 26.6 | 32.8 | 32.0 |
| $M_{100}$, MPa | 3.5 | 3.8 | 4.0 | 6.3 | 8.8 | 14.1 | 17.2 | 20.7 | 23.8 | 26.6 | 30.1 |
| E, MPa | 3.1 | 3.5 | 4.0 | 6.0 | 10.3 | 41.5 | 134 | 332 | 599 | 872 | 1348 |
| Ult. Elong., % | 570 | 630 | 620 | 550 | 500 | 450 | 390 | 320 | 320 | 330 | 240 |
| Ten. Set, % | 5 | 6 | 6 | 8 | 13 | 30 | 46 | 60 | 71 | 72 | 84 |
| TSB, MPa | 140 | 152 | 150 | 151 | 137 | 141 | 118 | 103 | 111 | 140 | 109 |
| Shore D Hardness | — | 24 | 24 | 27 | 30 | 39 | 40 | 48 | 47 | 59 | 60 |
| Oil Swell, wt. % | 86 | 64 | 64 | 58 | 49 | 38 | 24 | 17 | 11 | 7 | 4 |
| Flow Temperature, °C. | 200 | 242 | 242 | 241 | 256 | 250 | 249 | 262 | 263 | 225 | 225 |

The effect of neutralization of the acid containing acrylic rubber by addition of magnesium oxide is shown in Table 2. The preparation procedure and the components of the compositions are the same as in Table 1. The proportions of components are indicated in the table. Stocks 1 and 6 are controls containing no magnesium oxide. The amount of magnesium oxide is varied from one-half part to 4 parts by weight of magnesium oxide per 100 parts by weight of rubber. Tensile properties of elastomeric Stocks 1–5 are measured by pulling specimens at 50.8 cm. per minute to failure. Tensile properties of toughened plastic Stocks 6–10 are measured by pulling test specimens at 2.54 cm. per minute to failure. Young's modulus is determined as before. For both the hard and soft materials, the data show that tensile strength and true stress at break, TSB, are improved by additions of one-half part by weight of magnesium oxide per 100 parts by weight of rubber. The data also show that optimum tensile strength and true stress at break are obtained when two parts by weight of magnesium oxide are added per 100 parts by weight of the rubber.

Compositions of the invention comprising different polyesters are illustrated in Table 3. The acidic acrylic rubber is the same as in Table 1. The polyester of Stocks 1 and 2 is poly(ethyleneterephthalate) (PET) m.p. 265° C. Stock 3 contains poly(2-propylidene-4,4'-bis phenol carbonate) having a softening point of about 160° C.

TABLE 2

|   | 1 | 2 | 3 | 4 | 5 | 6 | 7 | 8 | 9 | 10 |
|---|---|---|---|---|---|---|---|---|---|---|
| Acidic Acrylic Rubber | 70 | 70 | 70 | 70 | 70 | 30 | 30 | 30 | 30 | 30 |
| Polyester (PTMT) | 30 | 30 | 30 | 30 | 30 | 70 | 70 | 70 | 70 | 70 |
| Silica, Stabilizers & Processing Aids | 16.1 | 16.1 | 16.1 | 16.1 | 16.1 | 6.9 | 6.9 | 6.9 | 6.9 | 6.9 |
| MgO | 0 | 0.35 | 0.70 | 1.4 | 2.8 | 0 | 1.15 | 0.30 | 0.60 | 1.2 |
| Properties |   |   |   |   |   |   |   |   |   |   |
| TS, Mpa | 0.03 | 7.2 | 17.3 | 27.7 | 26.6 | 21.9 | 31.1 | 34.1 | 38.7 | 37.8 |
| $M_{100}$, MPa | 0.9 | 2.0 | 6.2 | 11 | 12 | — | 24 | 24 | 26 | 27 |
| E, MPa | 2.1 | 3.2 | 6.9 | 20 | 22 | 842 | 1120 | 694 | 625 | 611 |
| Ult. Elong., % | 2200 | 740 | 550 | 470 | 460 | 29 | 290 | 320 | 330 | 300 |
| Ten. Set, % | 45 | 10 | 15 | 20 | 25 | — | — | — | — | — |
| TSB, MPa | 0.7 | 61 | 113 | 157 | 148 | 28 | 121 | 143 | 167 | 150 |

TABLE 3

|   | 1 | 2 | 3 |
|---|---|---|---|
| Acidic Acrylic Rubber | 70 | 60 | 60 |
| Polyester (PET) | 30 | 40 | — |
| Polycarbonate | — | — | 40 |
| Silica, Stabilizers & Processing Aids | 16.1 | 13.8 | 13.8 |
| MgO | 1.4 | 1.2 | 1.8 |
| Properties |   |   |   |
| TS, MPa | 18.9 | 17.4 | 16.6 |
| $M_{100}$, MPa | 9.6 | 14.4 | 7.0 |
| E, MPa | 15 | 45 | 6.5 |
| Ult. Elong., % | 270 | 200 | 230 |
| Ten. Set, % | 11 | 22 | 20 |
| TSB, MPa | 70 | 52 | 54 |
| Shore D Hardness | 30 | 38 | 29 |

The compositions are prepared by the procedure of Table 1 except for Stocks 1 and 2 in which the mixing temperature is about 260° C. and specimens are compression molded at 300° C. The data show that elastomeric compositions are obtained.

The use of other metal ion sources for neutralizing the acrylic copolymer rubber results in improved blends. The procedure for preparing the compositions are the same as in Table 1. Zinc, calcium, sodium, lithium, potassium and barium ions are satisfactory. The metals may be added in the form of oxides or salts such as acetates or carbonates.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A thermoplastic composition comprising a blend of about 25 to 98 parts by weight of neutralized acid containing acrylic copolymer rubber, and about 75 to 2 parts by weight of thermoplastic crystalline polyester per 100 parts by weight of said rubber and thermoplastic crystalline polyester combined.

2. The composition of claim 1 having a flow temperature of at least 10° C. above the flow temperature of the thermoplastic crystalline polyester.

3. The composition of claim 2 in which the thermoplastic crystalline polyester has a melting point between 160°–260° C.

4. The composition of claim 3 in which the thermoplastic crystalline polyester is poly(tetramethyleneterephthalate).

5. An elastoplastic composition comprising a blend of neutralized acid containing acrylic copolymer rubber, in an amount sufficient to impart rubberlike elasticity up to 98 weight percent of the composition, and thermoplastic crystalline polyester, in an amount up to 50 weight percent of the composition, with the proviso that when the amount of thermoplastic crystalline polyester exceeds the amount of rubber, sufficient plasticizer is present to impart rubberlike elasticity to the composition.

6. The composition of claim 5 comprising 98 to 50 parts by weight of metal ion neutralized acid containing acrylic copolymer rubber and 2 to 50 parts by weight of thermoplastic crystalline polyester per 100 parts by weight of said rubber and thermoplastic crystalline polyester combined.

7. The composition of claim 6 comprising metal ion neutralized acid containing acrylic copolymer rubber and about 10 to 40 parts by weight percent of thermoplastic crystalline polyester per 100 parts by weight of said rubber and thermoplastic crystalline polyester combined.

8. The composition of claim 7 in which the rubber is a copolymer of ethylene, alkyl acrylate and unsaturated carboxylic acid.

9. The composition of claim 8 in which the rubber comprises at least 50 mole percent of ethylene, about 0.5 to 10 mole percent of acrylic or methacrylic acid, and up to about 49.5 mole percent of alkyl acrylate.

10. The composition of claim 9 in which the thermoplastic crystalline polyester melts at about 160°–260° C.

11. The composition of claim 10 in which the source of metal ion is a metal oxide.

12. The composition of claim 11 in which the rubber is neutralized with magnesium ion or zinc ion.

13. The composition of claim 12 comprising a copolymer rubber containing about 1 to 5 weight percent of acrylic acid and about 0.5 to 4 parts by weight of metal oxide per 100 parts by weight of rubber.

14. The composition of claim 13 in which the thermoplastic crystalline polyester is poly(tetramethyleneterephthalate).

15. The composition of claim 14 in which the metal oxide is magnesium oxide.

* * * * *